United States Patent
Matsuzawa

(10) Patent No.: US 10,977,830 B2
(45) Date of Patent: Apr. 13, 2021

(54) CALIBRATION DEVICE, CALIBRATION METHOD, OPTICAL DEVICE, IMAGE-ACQUISITION DEVICE, AND PROJECTION DEVICE

(71) Applicant: OLYMPUS CORPORATION, Tokyo (JP)

(72) Inventor: Toshiaki Matsuzawa, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 86 days.

(21) Appl. No.: 16/266,286

(22) Filed: Feb. 4, 2019

(65) Prior Publication Data

US 2019/0180476 A1 Jun. 13, 2019

Related U.S. Application Data

(63) Continuation of application No. PCT/JP2017/020493, filed on Jun. 1, 2017.

(30) Foreign Application Priority Data

Aug. 12, 2016 (JP) .............................. JP2016-158606

(51) Int. Cl.
*G06T 7/80* (2017.01)
*G06T 7/60* (2017.01)
(Continued)

(52) U.S. Cl.
CPC ................ *G06T 7/80* (2017.01); *G06T 5/006* (2013.01); *G06T 7/60* (2013.01); *H04N 5/232* (2013.01);
(Continued)

(58) Field of Classification Search
CPC .. G06T 7/80; G06T 5/006; G06T 7/60; H04N 5/3572; H04N 17/002; H04N 5/232
See application file for complete search history.

(56) References Cited

U.S. PATENT DOCUMENTS

2004/0170315 A1 9/2004 Kosaka et al.
2011/0157373 A1* 6/2011 Ye .............................. G06T 7/85
348/187
(Continued)

FOREIGN PATENT DOCUMENTS

EP 1434169 A2 6/2004
EP 3220099 A1 9/2017
(Continued)

OTHER PUBLICATIONS

International Search Report dated Aug. 22, 2017 issued in PCT/JP2017/020493.
(Continued)

*Primary Examiner* — Qian Yang
(74) *Attorney, Agent, or Firm* — Scully, Scott, Murphy & Presser, P.C.

(57) ABSTRACT

A calibration device includes: a two-dimensional image conversion element having a plurality of pixels; and an optical system for forming an image-formation relationship between the two-dimensional image conversion element and a three-dimensional world coordinate space, the calibration device including a computer, the computer being configured to: acquire calibration data indicating a correspondence between two-dimensional pixel coordinates in the image conversion element and three-dimensional world coordinates in the world coordinate space; and calculate parameters of a camera model by fitting, to the acquired calibration data, the camera model representing two coordinate values of the two-dimensional pixel coordinates as functions of three coordinate values of the three-dimensional world coordinates, wherein the camera model represents the two coordinate values of the two-dimensional pixel coordinates by means of a linear sum of a plurality of two-dimensional vector functions having, as elements, the functions of the three coordinate values of the three-dimensional world coordinates.

19 Claims, 7 Drawing Sheets

(51) Int. Cl.
H04N 5/232 (2006.01)
H04N 5/357 (2011.01)
G06T 5/00 (2006.01)
H04N 17/00 (2006.01)

(52) U.S. Cl.
CPC ......... H04N 5/3572 (2013.01); H04N 17/002 (2013.01)

(56) References Cited

U.S. PATENT DOCUMENTS

2015/0260509 A1* 9/2015 Kofman ............ G01B 11/2504
356/601
2017/0243374 A1 8/2017 Matsuzawa

FOREIGN PATENT DOCUMENTS

| JP | 2004-213332 A | 7/2004 |
| JP | 2007-309660 A | 11/2007 |
| WO | WO 2016/076400 A1 | 5/2016 |

OTHER PUBLICATIONS

"Digital Image Processing, Revised New Version", pp. 308-317, Computer Graphic Arts Society (Mar. 9, 2015), ISBN:978-4-903474-50-2 C3004, with partial English translation, cited in spec on p. 7.
Brown, D.C., "Close-range camera calibration", Photogramm Eng (1971), 37, pp. 855-866, cited in spec on p. 7.
Bradski, G. et al., "Learning OpenCV", (Sep. 2008), pp. 319-321, ISBN:978-0-596-51613-0, O'Reilly Media, CA, U.S.A.

* cited by examiner

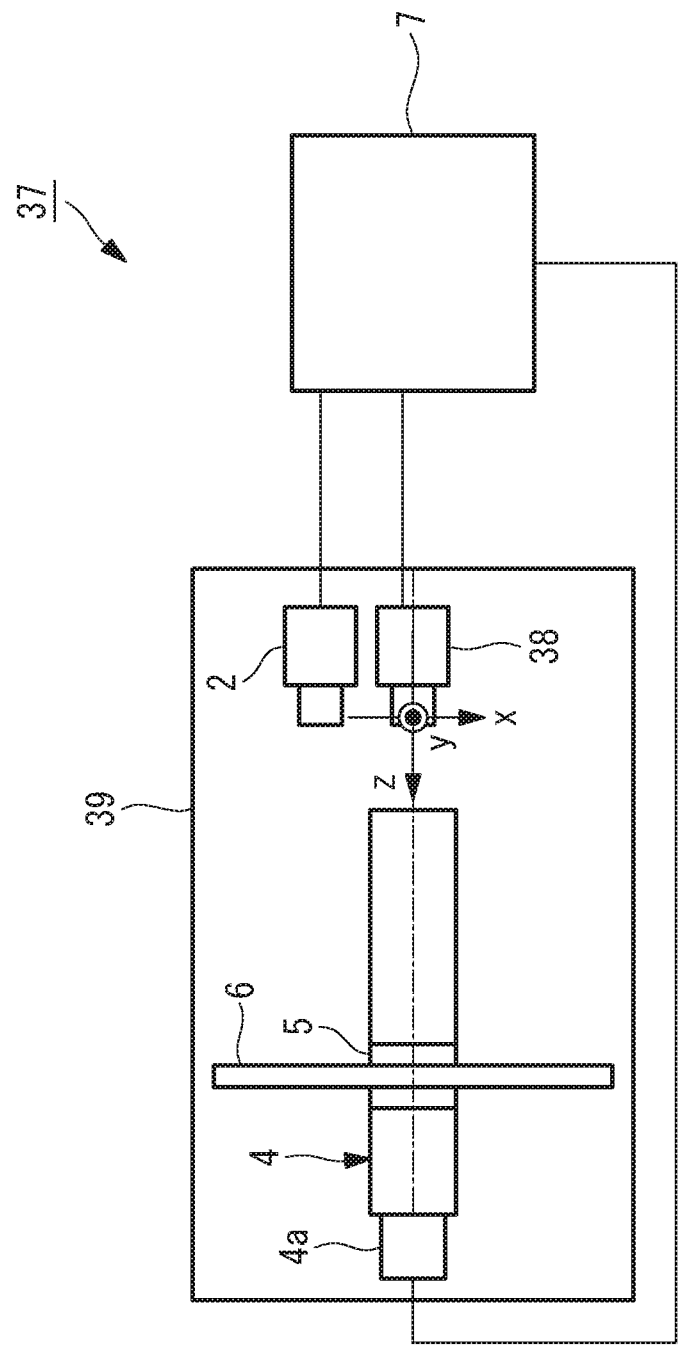

CALIBRATION DEVICE, CALIBRATION METHOD, OPTICAL DEVICE, IMAGE-ACQUISITION DEVICE, AND PROJECTION DEVICE

CROSS-REFERENCE TO RELATED APPLICATIONS

This is a continuation of International Application PCT/JP2017/020493, with an international filing date of Jun. 1, 2017, which is hereby incorporated by reference herein in its entirety.

This application is based on Japanese Patent Application No. 2016-158606, the contents of which are incorporated herein by reference.

TECHNICAL FIELD

The present invention relates to a calibration device, a calibration method, an optical device, an image-acquisition device, and a projection device.

BACKGROUND ART

There are known calibration devices for performing camera calibration of image-acquisition devices and projection devices (refer to, for example, Patent Literature 1). A camera model includes a plurality of unknown parameters (camera parameters), and by obtaining these camera parameters with a calibration device, real-world backprojection lines corresponding to two-dimensional coordinates in an image can be obtained mathematically. Alternatively, two-dimensional coordinates in an image corresponding to real-world three-dimensional coordinates can be obtained.

Here, the conventional camera calibration, disclosed in Patent Literature 1 and Non Patent Literature 1, will be described. Camera calibration is performed in the following procedure by using a mathematical camera model that expresses a process in which three-dimensional coordinates in the real world are image-captured by a camera and are converted into two-dimensional coordinates in an image. First, using Expression 1 below, three-dimensional coordinates in the real world (hereinbelow, referred to as world coordinates) (x, y, z) are projected on normalized image plane coordinates (up, vp).

$$\begin{cases} u_p = \dfrac{r_{11}x + r_{12}y + r_{13}z + t_x}{r_{31}x + r_{32}y + r_{33}z + t_z} \\ v_p = \dfrac{r_{21}x + r_{22}y + r_{23}z + t_y}{r_{31}x + r_{32}y + r_{33}z + t_z} \end{cases} \quad \{\text{Expression 1}\}$$

$$R = \begin{pmatrix} r_{11} & r_{12} & r_{13} \\ r_{21} & r_{22} & r_{23} \\ r_{31} & r_{32} & r_{33} \end{pmatrix}, T = \begin{pmatrix} t_x \\ t_y \\ t_z \end{pmatrix} \quad \{\text{Expression 2}\}$$

Note that the rotation matrix R and the translation vector T in Expression 2 express three-dimensional coordinate conversion of world coordinates into camera coordinates. These are values representing the position and orientation of the camera with respect to world coordinates and are called extrinsic parameters.

Note that Expression 1 is based on an assumption that all backprojection lines intersect at the optical center of the camera. Next, using Expression 3 below, (ud, vd) are obtained by adding distortion to normalized image plane coordinates (up, vp).

$$\begin{cases} u_d = u_p + g_1(u_p^2 + v_p^2) + g_3 u_p^2 + \\ \quad g_4 u_p v_p + k_1 u_p(u_p^2 + v_p^2) \\ v_d = v_p + g_2(u_p^2 + v_p^2) + g_3 u_p v_p + \\ \quad g_4 v_p^2 + k_1 v_p(u_p^2 + v_p^2) \end{cases} \quad \{\text{Expression 3}\}$$

Note that (g1, g2, g3, g4, k1) are distortion parameters. Furthermore, using Expression 4 below, the normalized image plane coordinates (ud, vd) obtained by adding distortion are converted into pixel-unit pixel coordinates (u, v).

$$\begin{cases} u = \alpha_u u_d + u_0 \\ v = \alpha_v v_d + v_0 \end{cases} \quad \{\text{Expression 4}\}$$

In this way, in a standard camera model, conversion of world coordinates (x, y, z), obtained by image acquisition with the camera, into pixel coordinates (u, v) is expressed with Expressions 1 to 4. Because the parameters ($\alpha u$, $\alpha v$, u0, v0, g1, g2, g3, g4, k1) in Expression 3 and Expression 4 represent the properties of the camera itself, they are called intrinsic parameters.

The distortion parameters are variously defined according to usage. For example, although Expression 3 expresses a model in which distortion of up to a third order is taken into consideration, a model in which a term of a higher order, such as a fifth, a seventh, or a higher order, is added is also used. Among them, a representative distortion model is Brown's model disclosed in Non Patent Literature 2, shown in Expression 5 below.

$$\begin{pmatrix} u_d \\ v_d \end{pmatrix} = \begin{pmatrix} u_p \\ v_p \end{pmatrix} + \quad \{\text{Expression 5}\}$$

$$(k_1 r_p^2 + k_2 r_p^4 + k_3 r_p^6 + \ldots)\begin{pmatrix} u_p \\ v_p \end{pmatrix} + \left[ p_1 \begin{pmatrix} r_p^2 + 2u_p^2 \\ 2u_p v_p \end{pmatrix} + \right.$$

$$\left. p_2 \begin{pmatrix} 2u_p v_p \\ r_p^2 + 2v_p^2 \end{pmatrix} \right](1 + p_3 r_p^2 + \ldots)$$

Here, rp2=up2+vp2.

In Brown's model, distortion is represented by parameters (k1, k2, k3, . . . ) for rotationally symmetrical radial distortion and parameters (p1, p2, p3, . . . ) for rotationally asymmetrical tangential distortion.

On the other hand, Patent Literature 2 discloses a camera model produced by directly modeling object-side backprojection lines corresponding to pixel coordinates. This model is characterized in that each coefficient of the distortion model is replaced with a linear expression of an object distance z. As one example thereof, Patent Literature 2 presents a camera model in Expression 6 below.

$$\begin{pmatrix} x \\ y \end{pmatrix} = (k_{A0}z + k_{B0})\begin{pmatrix} u \\ v \end{pmatrix} + \quad \{\text{Expression 6}\}$$

$$(k_{A1}z + k_{B1})r^2\begin{pmatrix} u \\ v \end{pmatrix} + (p_{A1}z + p_{B1})\begin{pmatrix} r^2 + 2u^2 \\ 2uv \end{pmatrix} +$$

$$(p_{A2}z + p_{B2})\begin{pmatrix} 2uv \\ r^2 + 2v^2 \end{pmatrix} + \begin{pmatrix} \Delta u_A z + \Delta u_B \\ \Delta v_A z + \Delta v_B \end{pmatrix}$$

Here, changes from Brown's model in Expression 5 to Expression 6 are as follows. (1) A term including a coefficient k0, which represents lateral magnification of pixel coordinates to world coordinates, is added. (2) Third-order radial distortion k1 and second-order tangential distortion (p1, p2) alone are taken into consideration. (3) Lateral translation (Δu, Δv) of the pixel coordinates with respect to the world coordinates is added.

Furthermore, Patent Literature 2 disclose a camera calibration algorithm for optimizing the rotation matrix R and the translation vector T in Expression 2 so as to minimize the residual error of the camera model in Expression 6.

Typically, in camera calibration, an image of a calibration chart having a plurality of feature points whose world coordinates (x, y, z) are known is captured with a camera. Subsequently, through image processing, pixel coordinates (u, v) at which the feature points are image-captured are acquired. In this way, a plurality of measurement data representing a correspondence between the world coordinates (x, y, z) and the pixel coordinates (u, v) are obtained, thereby obtaining the camera parameters.

CITATION LIST

Patent Literature

{PTL 1}
Japanese Unexamined Patent Application, Publication No. 2004-213332
{PTL 2}
PCT International Publication No. WO 2016/76400

Non Patent Literature

{NPL 1}
"DIGITAL IMAGE PROCESSING [newly revised edition]", Computer Graphic Arts Society, 2015, p. 308-317
{NPL 2}
D. C. Brown, "Close-range camera calibration", Photogramm, Eng. 37, 855-86 6, 1971

SUMMARY OF INVENTION

One aspect of the present invention is a calibration device for an optical device including: at least one two-dimensional image conversion element having a plurality of pixels; and an optical system for forming an image-formation relationship between the at least one two-dimensional image conversion element and a three-dimensional world coordinate space, the calibration device including a computer, the computer being configured to: acquire calibration data indicating a correspondence between two-dimensional pixel coordinates in the image conversion element and three-dimensional world coordinates in the world coordinate space; and calculate parameters of a camera model by fitting, to the acquired calibration data, the camera model representing two coordinate values of the two-dimensional pixel coordinates as functions of three coordinate values of the three-dimensional world coordinates, wherein the camera model represents the two coordinate values of the two-dimensional pixel coordinates by means of a linear sum of a plurality of two-dimensional vector functions having, as elements, the functions of the three coordinate values of the three-dimensional world coordinates.

Another aspect of the present invention is a calibration method for an optical device including: a two-dimensional image conversion element having a plurality of pixels; and an optical system for converting an image-formation relationship between the two-dimensional image conversion element and a three-dimensional world coordinate space, the method including: acquiring calibration data indicating a correspondence between two-dimensional pixel coordinates in the two-dimensional image conversion element and three-dimensional world coordinates in the world coordinate space; and calculating parameters of a camera model by fitting, to the acquired calibration data, a camera model representing two coordinate values of the two-dimensional pixel coordinates as functions of three coordinate values of the three-dimensional world coordinates, wherein the camera model represents the two coordinate values of the two-dimensional pixel coordinates by means of a linear sum of a plurality of two-dimensional vector functions having, as elements, the functions of the three coordinate values of the three-dimensional world coordinates.

Another aspect of the present invention is an optical device including a camera model in which parameters calculated by the above-described calibration device are set.

Another aspect of the present invention is an optical device including a camera model in which a rotation angle or a translation component acquired by the above-described calibration device is set as a parameter.

Another aspect of the present invention is an image-acquisition device including the above-described optical device.

Another aspect of the present invention is a projection device including the above-described optical device.

BRIEF DESCRIPTION OF DRAWINGS

FIG. 7 is a schematic plan view of a calibration device according to a fourth embodiment of the present invention.

DESCRIPTION OF EMBODIMENTS

A calibration device and a camera calibration method according to a first embodiment of the present invention will be described below with reference to the drawings.

The calibration device according to this embodiment is a camera calibration device 1 for calibrating a camera (image-acquisition device) 2 that transfers captured images to the outside as image files of certain formats. In this embodiment, the camera 2 is used as an example of an optical device.

Figure 1:
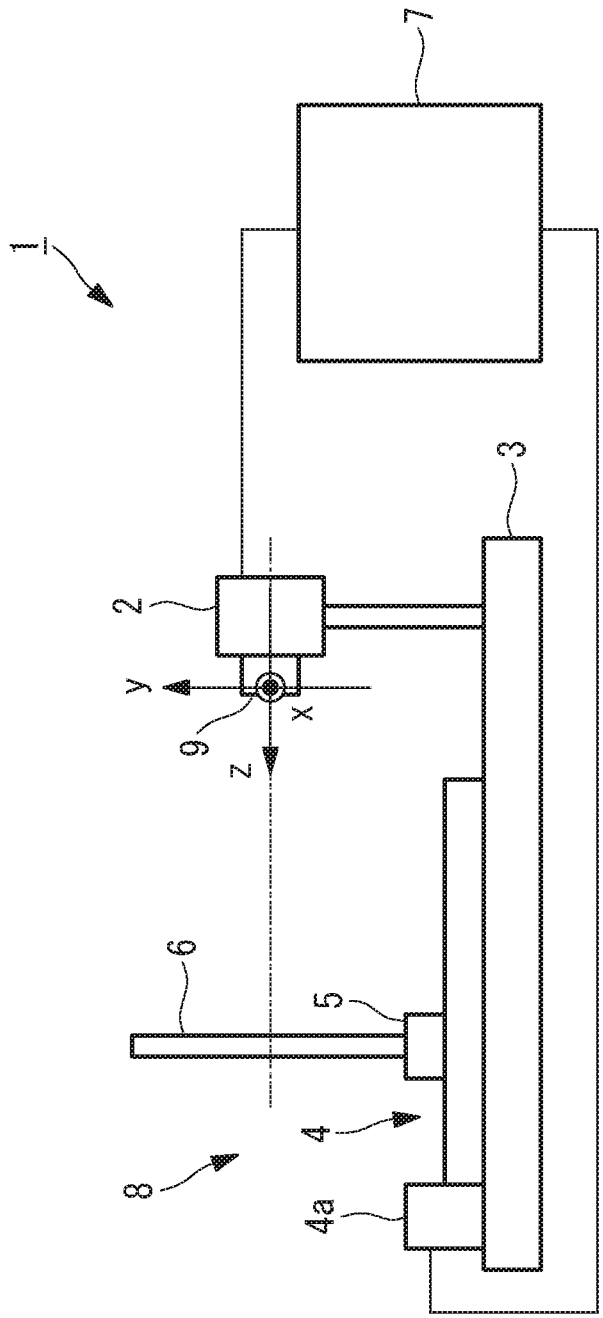
FIG. 1 is an overall configuration diagram schematically showing a calibration device according to a first embodiment of the present invention.

As shown in FIG. 1, the camera calibration device 1 according to this embodiment includes: a base 3 to which the camera 2 to be calibrated is fixed; a z-axis moving stage 4 provided on the base 3; a calibration chart 6 fixed to a movable part 5 moved by the z-axis moving stage 4; and a computer 7 connected to the camera 2 and to the z-axis moving stage 4. The three-dimensional-coordinate axes of the camera calibration device 1 are defined as shown in FIG. 1. The base 3 to which the camera 2 is fixed, the calibration chart 6, and the z-axis moving stage 4 constitute a calibration-data acquisition unit 8.

The z-axis moving stage 4 is a linear driving mechanism that is driven by a motor 4a to linearly move the movable part 5. In the camera calibration device 1, the direction in which the movable part 5 is moved is defined as the z-axis, and the horizontal direction and the perpendicular direction in a plane perpendicular to the z-axis are defined as the x-axis and the y-axis.

In this embodiment, the position of the coordinate origin is set in the vicinity of the entrance pupil of a camera lens 9.

The camera 2 is attached to the base 3 such that the optical axis thereof is parallel to the z-axis, such that the horizontal direction and the perpendicular direction of an image-acquisition surface are parallel to the x-axis and the y-axis, and such that the coordinate origin matches a certain position in the camera 2.

Figure 2:
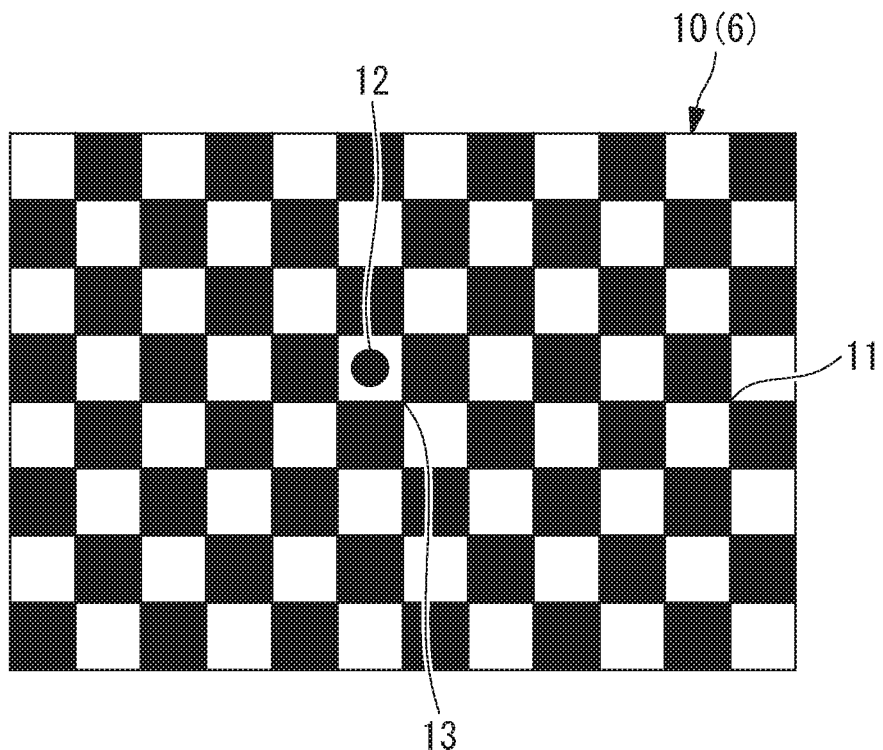
FIG. 2 is a diagram showing a pattern on a calibration chart of the calibration device in FIG. 1.

The calibration chart 6 is a chessboard 10 in FIG. 2, which is widely used in camera calibration, and is fixed to the movable part 5 so as to oppose, face-to-face, the camera 2 fixed to the base 3, that is, so as to be disposed in a plane perpendicular to the z-axis. The calibration chart 6 may be of any type, as long as it includes a plurality of feature points.

The calibration chart 6 can be moved by the z-axis moving stage 4 to an arbitrary position in the z-axis direction. The range in which the movable part 5 is moved by the z-axis moving stage 4 covers the range of the object distance (=the distance between the camera 2 and an image-acquisition target) for which camera calibration is necessary.

The computer 7 functions to control the image-acquisition operation of the camera 2 to read the captured images as image files of a certain format. Furthermore, the computer 7 functions to control the z-axis moving stage 4 to move the calibration chart 6 to a certain position in the z-axis direction. In addition, the computer 7 also functions as a parameter calculating unit that fits a camera model to acquired calibration data to calculate camera parameters.

Here, referring to FIG. 2, the chessboard 10 used as the calibration chart 6 will be described.

The chessboard 10 is a flat plate-like member having a checkered pattern in which black and white squares are arranged so as to form a square grid on a plane. Points of intersection, which correspond to the apexes of the squares, are used as feature points in camera calibration (hereinbelow, these feature points will be referred to as grid points 11).

As the chessboard 10, one in which a sufficient number of grid points 11 for camera calibration are in an image-acquisition area of the camera 2 is used. Although the area of the chessboard 10 to be image-captured varies with object distance, it is desirable that at least about 10×10 grid points 11 be image-captured at each object distance. Furthermore, to make the pixel coordinates of the image-captured grid points 11 correspond to the world coordinates of the grid points 11 on the calibration chart 6, a reference position mark 12 is provided near the center of the calibration chart 6.

The chessboard 10 is mounted on the camera calibration device 1 such that the grid point to the lower right of and closest to the reference position mark 12 (i.e., a grid point 13 at the center) is located on the z-axis, and, at the same time, such that the vertical direction and the horizontal direction of the chessboard 10 are parallel to the x-axis and the y-axis. As a result, on the basis of the grid interval of the square grid of the chessboard 10 and the movement position of the z-axis moving stage 4, the world coordinates (x, y, z) of the grid points 11 and 13 are determined as known values.

A camera calibration method using the thus-configured camera calibration device 1 according to this embodiment will be described below.

When calibrating the camera 2 by using the camera calibration device 1 according to this embodiment, an operator first attaches the camera 2 to be calibrated to the camera calibration device 1 according to the definition of the coordinate axes and connects the camera 2 to the computer 7. Thereafter, a measurement program in the computer 7 is started.

Subsequently, by the operation of the measurement program, images of the calibration chart 6 are automatically captured by the camera 2 at a plurality of object distances, and, from these images, the pixel coordinates of the grid points 11 are acquired. The measurement program will be described with reference to the flowchart in FIG. 3.

When measurement is started, first, the z-axis moving stage 4 is moved such that the calibration chart 6 is located at an end, closer to the camera 2, of the object distance range for which the camera 2 is calibrated (step S1). Next, an image of the calibration chart 6 is captured by the camera 2, and the image file is transferred to the computer 7 (step S2). Steps S1 and S2 are repeated until a predetermined number of images have been captured (step S3). The predetermined number is, for example, at least five.

At this time, in step S1, each time the step is repeated, the z-axis moving stage 4 moves the movable part 5 such that the object distance between the camera 2 and the calibration chart 6 increases by a predetermined increment. Although the movable part 5 does not have to be moved by the same distance, it is desirable that the image of the calibration chart 6 be captured at, at least, about five different object distances within the object distance range for which the camera 2 is calibrated. Once the predetermined number of images have been captured, the process proceeds to the next step, step S4.

As a result of the plurality of image files transferred to the computer 7 in steps S1 to S3 being subjected to image processing, the pixel coordinates of the grid points 11 in the image-acquisition area are obtained, and the pixel coordinates of the center of gravity of the reference position mark 12 in each image file are obtained (step S4). Note that, because the method for obtaining the pixel coordinates of the grid points 11 in the chessboard 10 at the subpixel level is known from the following documents and the like, the description thereof will be omitted here. G. Bradski and A. Kaehler (translated by Koichi Matsuda), "Detailed Explanation of Open CV—Image Processing and Recognition Using Computer Vision Library" (O'REILY Japan, 2009) p. 325-326.

Next, the pixel coordinates of the grid points 11 obtained in step S4 are made to correspond to the world coordinates of the grid points 11 on the calibration chart 6 (step S5). As described above, because the grid point 13 at the center, which is to the lower right of and closest to the reference position mark 12, is located on the z-axis of the world coordinates, by using it as the reference, the pixel coordinates and the world coordinates of the grid points 11 and 13 can be made to correspond to each other. Finally, all the pixel coordinates and world coordinates that are made to correspond to each other are written into the measurement data file, thus completing the measurement. Through this procedure, the measurement data needed for camera parameter optimization can be obtained.

Figure 4A:
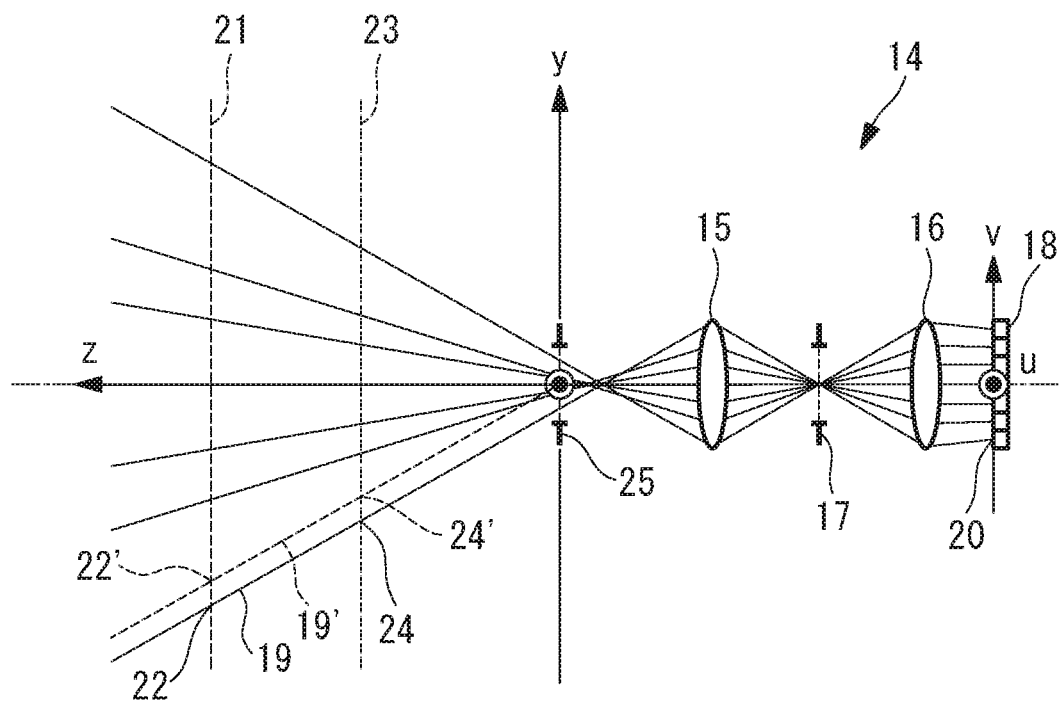
FIG. 4A is a diagram showing the relationship between world coordinates and pixel coordinates in the calibration device in FIG. 1.
Figure 4B:
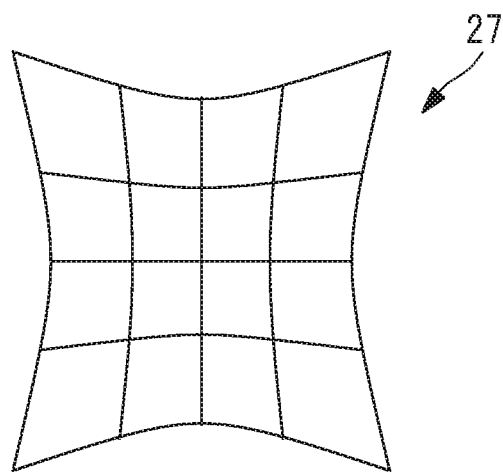
FIG. 4B is a diagram showing an example image with barrel distortion.
Figure 4C:
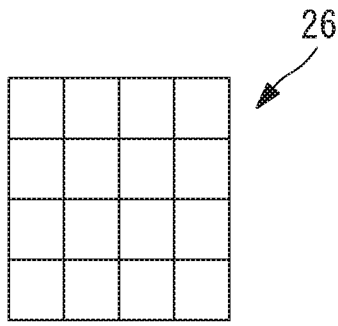
FIG. 4C is a diagram showing an example image without distortion.

Here, the camera model used in this embodiment will be described with reference to FIGS. 4A to 4C. FIG. 4A is a sectional view of the camera 2 for explaining the relationship between pixel coordinates in the camera 2 and object-side backprojection lines. The camera 2 includes: an image-acquisition optical system 14 including lenses 15 and 16 and an aperture stop 17; and an image-acquisition element (image conversion element) 18.

The world coordinates (x, y, z) on the object side are defined in the same way as in FIG. 1. Furthermore, a u-axis and a v-axis for the pixel coordinates are defined on the image-acquisition surface of the image-acquisition element 18 so as to be parallel to the horizontal direction and the vertical direction of the image-acquisition element 18. In FIG. 4A, principal rays 19 incident on the centers of the pixels of the image-acquisition element 18 through the image-acquisition optical system 14 are illustrated.

The principal rays 19 are the rays that pass through the center of the aperture stop 17 of the image-acquisition optical system 14. Herein, the concept of the principal rays 19 will be described by taking as an example an image point 20 at which an image is formed at the center of one pixel and the principal ray 19 corresponding thereto. First, assume a plane 21 conjugate with the image-acquisition surface of the image-acquisition element 18. An object point 22 located at the intersection point between the plane 21 and the principal ray 19 forms an image at the image point 20 through the image-acquisition optical system 14. In other words, if aberrations are ignored, all the rays passing through the object point 22 are incident on one point, i.e., the image point 20.

Next, assume an object point 24 shifted from the conjugate object point 22, along the principal ray 19, onto a plane 23 not conjugate with the image-acquisition surface. Because the rays passing through the non-conjugate object point 24 are not focused on one point, i.e., the image point 20, the image point on the image-acquisition surface is blurred and spread.

At this time, if coma is ignored, the blurred image spreads from the position of incidence of the principal ray 19 passing through the center of the aperture stop 17. Hence, if the center of gravity of the light intensity of the blurred image point is assumed to be the image position, the position of the image point 20 does not change. Thus, all the object points 22 and 24 on the principal ray 19 on the object side form an image at the one image point 20. In other words, the principal ray 19 on the object side is a backprojection line of the image point 20.

Next, pupil aberration will be described. A virtual aperture, which is an image of the aperture stop 17 formed by the lens 15 located on the object side of the aperture stop 17, is an entrance pupil 25. Although the object-side principal rays pass through the center of the entrance pupil 25 and the vicinity thereof, unlike the case of the aperture stop 17, they do not intersect at one point at the center of the entrance pupil 25. This is because aberration of the lens 15 exists in the image-formation relationship between the aperture stop 17 and the entrance pupil 25. This is pupil aberration.

Next, object-distance-dependent variation in distortion of the image-acquisition optical system 14 due to pupil aberration will be described. When image formation with the image-acquisition optical system 14 involves barrel distortion, image formation in the reverse direction, i.e., from the image side to the object side, involves pincushion distortion. More specifically, a square-grid pixel array 26 of the image-acquisition element 18, as shown in FIG. 4C, forms an image 27 distorted in a pincushion shape, as shown in FIG. 4B, on the conjugate plane 21 on the object side.

Here, assume a situation in which there is no pupil aberration, and all the object-side principal rays 19 intersect at one point at the center of the entrance pupil 25. At this time, the intersection points between the non-conjugate plane 23, which is parallel to the conjugate plane 21, and the principal rays corresponding to the pattern of the pixel array 26, as shown in FIG. 4C, form a pattern analogous to the image 27 on the conjugate plane 21, as shown in FIG. 4B. In other words, the shape of the distortion does not change with object distance. However, because the actual image-acquisition optical system 14 has pupil aberration, the shape of the distortion changes with object distance.

The camera model of the present invention, which is formed so as to be adapted to this situation, will be described. First, the image-formation relationship from the world coordinates (x, y, z) of the object point 22 on the plane 21 conjugate with the image-acquisition element 18 to the pixel coordinates (u, v) of the image point 20 on the image-acquisition element 18 is expressed by an image-formation expression, including distortion. In this embodiment, the image-formation expression in Expression 7 below is used on the basis of Brown's model in Expression 5. Note that Brown's model is a model representing the relationship between the image-forming positions on two conjugate planes and can be fitted to the image-formation relationship from the object point (x, y, z) to the image point (u, v).

$$\begin{pmatrix} u \\ v \end{pmatrix} = \qquad \text{\{Expression 7\}}$$

$$k_0 \begin{pmatrix} x' \\ y' \end{pmatrix} + k_1 r'^2 \begin{pmatrix} x' \\ y' \end{pmatrix} + p_1 \begin{pmatrix} r'^2 + 2x'^2 \\ 2x'y' \end{pmatrix} + p_2 \begin{pmatrix} 2x'y' \\ r'^2 + 2y'^2 \end{pmatrix}$$

where $x' = \dfrac{x}{z}, y' = \dfrac{y}{z}, r'^2 = x'^2 + y'^2$

Here, changes from Brown's model in Expression 5 to the image-formation expression in Expression 7 are as follows. (1) A term including a coefficient k0, which represents the lateral magnification from the world coordinates to the pixel coordinates, is added. (2) Third-order radial distortion k1 and second-order tangential distortion (p1, p2) alone are taken into consideration. (3) Coordinates (x', y'), which are obtained by normalizing the world coordinates (x, y) with respect to the object distance z, are used.

Next, a virtual principal ray 19' that is parallel to the principal ray 19 and that passes through the center of the entrance pupil 25 will be described. At the limit where the object distance z is infinite, an object point on the principal ray 19 and an object point on the virtual principal ray 19' form images at the same image point. This is because the object-side image-acquisition area corresponding to the effective image-acquisition area on the image-acquisition element 18 also spreads infinitely, and compared with this, the distance between the principal ray 19 and the virtual principal ray 19' is negligible.

However, when the object distance z is finite, the positions of the image points corresponding to the object point 22 on the principal ray 19 and an object point 22' on the virtual principal ray 19', respectively, do not match. The discrepancy between them is approximately inversely proportional to the object distance z on the pixel coordinates. This is because the distance between the principal ray 19 and the virtual principal ray 19' (the distance between the object points 22 and 22' on the plane 21, as well as the distance between the object points 24 and 24' on the plane 23 at another object distance) is constant regardless of the object distance. On the other hand, the object-side effective image-acquisition area spreads so as to be approximately proportional to the object distance z.

For these reasons, the camera model as in Expression 8 according to this embodiment is obtained by replacing each of the coefficients of the image-formation expression in Expression 7 with a power polynomial of the reciprocal of the object distance z.

$$\begin{pmatrix} u \\ v \end{pmatrix} = k'_0 \begin{pmatrix} x' \\ y' \end{pmatrix} + k'_1 r'^2 \begin{pmatrix} x' \\ y' \end{pmatrix} +$$

$$p'_1 \begin{pmatrix} r'^2 + 2x'^2 \\ 2x'y' \end{pmatrix} + p'_2 \begin{pmatrix} 2x'y' \\ r'^2 + 2y'^2 \end{pmatrix}$$

{Expression 8} where $k'_0 = k_{0,0} + k_{0,1} \frac{1}{z} + k_{0,2} \frac{1}{z^2} + \ldots$, $k'_1 = k_{1,0} + k_{1,1} \frac{1}{z} + k_{1,2} \frac{1}{z^2} + \ldots$, $p'_1 = p_{1,0} + p_{1,1} \frac{1}{z} + p_{1,2} \frac{1}{z^2} + \ldots$, $p'_2 = p_{2,0} + p_{2,1} \frac{1}{z} + p_{2,2} \frac{1}{z^2} + \ldots$ Constant terms k00, k10, p10, and p20 in the power polynomials of the reciprocal of the object distance z represent that, at a limit where the object distance z is infinite, an object point on the principal ray 19 and an object point on the virtual principal ray 19' form images at the same image point. In addition, coefficients k01, k11, p11, and p21 of the reciprocal of the object distance z indicate that the discrepancy between both the image points is inversely proportional to the object distance z. Furthermore, in order to enhance approximation accuracy, it is also possible to use terms that are equal to or higher than the square of the reciprocal of the object distance z. In addition, if the pupil aberration is negligible, it is also possible to use a camera model based on Expression 8 including only the constant terms k00, k10, p10, and p20.

In this manner, the camera model represented by Expression 8 and used in the camera calibration device 1 according to this embodiment is obtained by directly modeling pixel coordinates corresponding to world coordinates. The camera model is constructed on the basis of the linear model in Expression 7, representing the image-formation relationship between world coordinates and pixel coordinates, including distortion. In order to express the influence of pupil aberration, each coefficient of the linear model of Expression 7 representing the image-formation relationship is replaced with a power polynomial of the reciprocal of the object distance z.

The camera model used in the camera calibration device 1 according to this embodiment is also characterized in that pixel coordinate vectors (u, v) are represented by a linear sum of linearly independent two-dimensional basic function vectors composed of variables (x, y, z). Because the camera model is a linear sum of basic function vectors, the coefficients of the model representing the u-coordinate and the v-coordinate are common to each other. Therefore, the coefficients of each of the basic function vectors can be obtained from all the measurement data by using a linear least-squares method. A description thereof will be given below.

Figure 3:
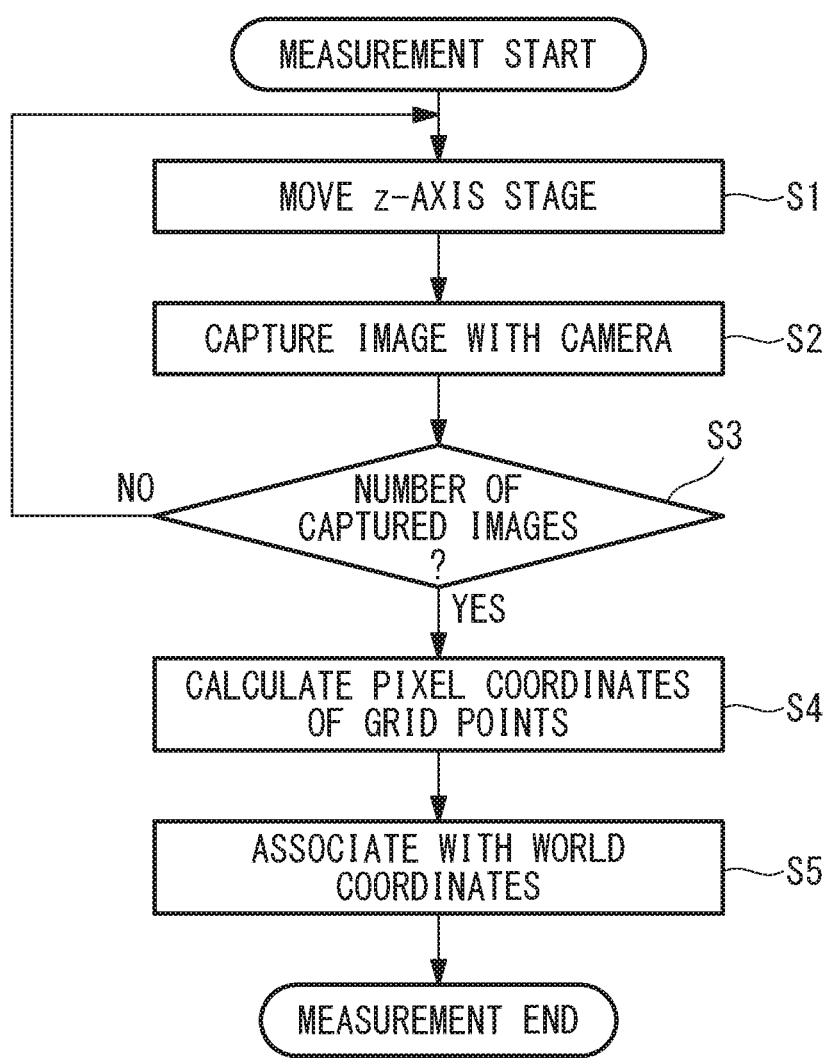
FIG. 3 is a flowchart showing a calibration method according to the first embodiment of the present invention.

First, in the above-described measurement program shown in FIG. 3, measurement data representing the correspondence between the world coordinates (x, y, z) and the pixel coordinates (u, v) are obtained. Next, the camera model expressed in Expression 8, with independent variables (x, y, z) and dependent variables (u, v), is fitted to the measurement data of all the grid points by a linear least-squares method to obtain the coefficients (camera parameters) in the camera model of Expression 8. Thus, the camera calibration according to this embodiment is completed.

The camera model in which the camera parameters obtained according to this embodiment are set can be used in an image-acquisition device including the camera 2 that is provided with this camera model, as follows. Note that the image-acquisition device further includes: a pixel-coordinate calculation unit (not shown in the figure) that calculates two-dimensional pixel coordinate values from three-dimensional world coordinates; and a distortion-corrected-image generating unit (not shown in the figure) that generates an image in which distortion is corrected.

Firstly, by substituting the world coordinates (x, y, z) image-captured by the calibrated camera 2 into the camera model in Expression 8, the pixel coordinates (u, v) of the image formed thereby can be obtained in the pixel-coordinate calculation unit.

Secondly, the distortion of the image captured by the camera 2, which has been calibrated, can be corrected by the distortion-corrected-image generating unit. The method therefor will be described. An image of an object represented by world coordinates is distorted when captured by the camera 2. In addition, by backprojecting the obtained image onto the world coordinates, the distortion can be corrected. When an image of an object on a plane at a known object distance z is captured, it is advisable that the pixel coordinates (u, v) be backprojected onto the world coordinates (x, y) on the plane at the object distance z.

On the other hand, when an image of an object not on such a plane is captured, a distortion-correction reference object distance is defined, and the image is backprojected on the world coordinates (x, y) at that object distance z. When the variation in distortion with object distance is small, this distortion correction suffices. However, when backprojected on the world coordinates, the image expands or contracts. Hence, the backprojected world coordinates are normalized by the reciprocal of the lateral magnification k0', i.e., the lateral magnification from the pixel coordinates to the world coordinates, in the camera model in Expression 8. By doing so, a distortion-corrected image having substantially the same size as the original image can be obtained.

Formation of a distortion-corrected image is a series of procedures in which the pixel values, of the original image, corresponding to the pixel coordinates (integers) of the image after distortion correction are substituted into the pixel coordinates after distortion correction. The procedures will be described with reference to the flowchart in FIG. 5. When distortion correction is started, first pixel coordinates (uc, vc) after distortion correction are determined (step S11).

Next, the world coordinates (x, y) are obtained by multiplying the determined pixel coordinates (uc, vc) by the reciprocal of the lateral magnification k0' in the camera model in Expression 8 at the reference object distance z (step S12). Then, the pixel coordinates (u, v) before distortion correction are obtained by substituting the obtained world coordinates (x, y, z) into the camera model in Expression 8 (step S13).

Typically, these pixel coordinates (u, v) before distortion correction are non-integers. Hence, the pixel values of the pixel coordinates (u, v) are obtained from the pixel values of the four pixels adjacent to those pixel coordinates by bilinear interpolation. Then, the obtained pixel values are used as the pixel values of the pixel coordinates (uc, vc) after distortion correction (step S14). Note that, for interpolation of pixel values, another method, such as bicubic interpolation, may be employed.

The above-described steps S11 to S14 are repeated for all the pixel coordinates (uc, vc) after distortion correction (step S15), and then, distortion correction is completed.

In the above-described first to second camera-model usage examples, the pixel coordinates corresponding to the world coordinates are calculated each time by using the camera model in Expression 8. On the other hand, by preliminarily calculating them and storing them as data arrays, the speed of calculation can be increased.

In this embodiment, camera calibration is performed by using the measurement data of the grid points 11 and 13 arranged in a square-grid pattern on the planar chessboard 10. However, the feature points on the calibration chart 6 may be patterns other than the grid points 11 and 13.

For example, it is possible to employ a measurement-data forming method in which an image of dot marks distributed over a plane is captured, and the position of the center of gravity thereof is used as the pixel coordinates. Moreover, the feature points used in camera calibration of the present invention do not have to be regularly arrayed in the world coordinate space. Even when the feature points are randomly arranged, if it is possible to know the correspondence between the world coordinates and the pixel coordinates thereof by measurement, simulation, or other methods, the camera model of the present invention can be fitted thereto by a linear least-squares method.

As has been described, elucidated correspondence between the world coordinates and the pixel coordinates is the only condition required for the measurement data for camera calibration according to this embodiment. Such measurement data may be acquired by, for example, the following method. First, a point light source that can be moved in the x-, y-, and z-axis directions is prepared on the world coordinate side. Then, the point light source is moved in the x-, y-, and z-axis directions such that the image of the point light source is positioned at the pixel coordinates of interest in an image of the point light source captured by the camera 2. By repeating such measurement, the correspondence between the world coordinates and the pixel coordinates can also be obtained.

In this embodiment, the camera model in which third-order radial distortion and second-order tangential distortion alone are taken into consideration is employed. However, when a camera 2 having greater distortion is to be calibrated, a camera model in which terms of even higher order distortions and rotationally asymmetrical distortions are added may also be employed. In that case, a linear model, such as the image-formation expression in Expression 7 representing the image-formation relationship between the image-acquisition surface of the image-acquisition element 18 and the plane 21 conjugate therewith, is prepared.

Then, by replacing each of the coefficients of this linear model with a power polynomial of the reciprocal of the object distance z, as in the camera model in Expression 8, a new camera model can be constructed. The optimization method for obtaining the coefficients is the same as that in this embodiment.

Conversely, it is possible to omit unnecessary terms from the camera model. For example, when calibrating a camera 2 in which the rotationally asymmetrical distortion component is so small that it can always be ignored, it is desirable that the tangential distortion term in the camera model in Expression 8 be omitted. By doing so, it is possible to prevent the camera model from being irrelevantly deformed and becoming inaccurate due to a measurement error of the grid points 11. This also applies to other terms.

In a case where a conventional backprojection camera model is additionally used in an image-acquisition device including the camera 2 provided with the camera model obtained according to this embodiment, it is possible to obtain the camera parameters of each of these camera models by fitting the backprojection camera model and the camera model in Expression 8 to measurement data. These two camera models should in fact have an inverse-function relationship with each other. However, because measurement data contains measurement errors, it is possible that the two camera models obtained as described above do not always have an accurate inverse-function relationship.

In this case, one of the camera models may be obtained from measurement data, and the other camera model may be acquired via the obtained one model. More specifically, first, the backprojection camera model is fitted to measurement data, and the camera parameters thereof are obtained. Next, pseudo-measurement data representing the correspondence between the world coordinates and the pixel coordinates is generated by using the backprojection camera model. Then, camera parameters are obtained by fitting the camera model in Expression 8 to the generated pseudo-measurement data. Alternatively, first, the camera model in Expression 8 may be fitted to measurement data. Because the above-described pseudo-measurement data does not contain a measurement error, the two camera models obtained in this manner can hold an accurate inverse-function relationship.

In this way, according to the camera calibration device 1 and the camera calibration method according to this embodiment, the pupil aberration of the image-acquisition optical system 14 can be accurately modeled by the camera model according to this embodiment. In addition, the rotationally asymmetrical distortion and the pupil aberration can also be modeled. As a result, it is possible to accurately express the pixel coordinates corresponding to the world coordinates, thus improving the precision of the camera model.

Furthermore, because the camera model used in the camera calibration device 1 and in the camera calibration method according to this embodiment is a linear model, it can be fitted to the measurement data by a linear least-squares method. Hence, unlike conventional models that employ repeated optimization, the optimization does not fail and the calculation time can be significantly reduced.

Furthermore, according to the camera model according to this embodiment, it is possible to obtain pixel coordinates corresponding to the world coordinates directly and in a short time without requiring repeated optimization.

Furthermore, the feature points used in the camera calibration device 1 and the camera calibration method according to this embodiment do not have to be regularly arrayed. Hence, provided that the correspondence between the world coordinates and the pixel coordinates can be elucidated, it is possible to select any acquisition method, either by measurement or calculation, suitable for the camera 2 to be calibrated.

Next, a camera calibration method according to a second embodiment of the present invention will be described below with reference to the drawings. In the first embodiment, as shown in FIG. 1, a camera calibration method in which the entrance pupil of the camera 2 to be calibrated substantially coincides with the origin of the world coordinates, the optical axis of the camera 2 is parallel to the z-axis of the camera calibration device 1, and the horizontal direction and the perpendicular direction of the image-acquisition surface are parallel to the x-axis and the y-axis has been described. In this embodiment, a camera calibration method when such conditions are not satisfied, namely, when the world coordinates do not coincide with the camera coordinates, will be described.

The camera model used in the first embodiment is established on the basis of camera coordinates whose origin is the center of the entrance pupil 25 of the image-acquisition optical system 14 in the camera 2 to be calibrated. Therefore, when the world coordinates of the grid points 11 on the calibration chart 6 in the camera calibration device 1 in FIG. 1 are converted into camera coordinates, the above-described camera model is fitted. Conversion of the world coordinates (x, y, z) into camera coordinates (xc, yc, zc) is expressed by Expression 9 by using the three-axis rotation matrix R and translation vector T in Expression 2.

$$\begin{pmatrix} x_c \\ y_c \\ z_c \end{pmatrix} = \begin{pmatrix} r_{11} & r_{12} & r_{13} \\ r_{21} & r_{22} & r_{23} \\ r_{31} & r_{32} & r_{33} \end{pmatrix} \begin{pmatrix} x \\ y \\ z \end{pmatrix} + \begin{pmatrix} t_x \\ t_y \\ t_z \end{pmatrix} \quad \{\text{Expression 9}\}$$

In the second embodiment, only the world coordinates, of the measurement data representing the correspondence between the world coordinates (x, y, z) and the pixel coordinates (u, v) of the plurality of measured grid points 11, are converted into the camera coordinates (xc, yc, zc) by means of Expression 9, and then, the camera model according to the first embodiment is fitted thereto. Then, the three-axis rotation angles θx, θy, and θz of the rotation matrix R and the three components (tx, ty, tz) of the translation vector T are optimized so as to minimize the residual error of the camera model. Typically, the residual error of the camera model is minimized when the world coordinates converted on the basis of Expression 9 coincide with the camera coordinates.

Next, a procedure for optimizing the camera model by the camera calibration method according to the second embodiment will be described. First, in the same way as in the first embodiment, measurement data representing the correspondence between the world coordinates (x, y, z) and the pixel coordinates (u, v) is obtained.

Next, the rotation angles θx, θy, and θz and the three components (tx, ty, tz) of the translation vector, serving as the optimization parameters, are repeatedly optimized by using, as an evaluation function, the standard deviation of the residual errors when the camera model in Expression 8 is fitted, by a linear least-squares method, to the camera coordinates (xc, yc, zc) resulting from converting the world coordinates of the measurement data on the basis of Expression 9 and to the pixel coordinates (u, v). The initial values of the rotation angles θx, θy, and θz and the three components (tx, ty, tz) of the translation vector may be zero. Alternatively, when the rotation angles and the translation vectors of the camera 2 can be estimated by some method, they may be used as the initial values.

This repeated optimization can be performed by a typical algorithm, such as a downhill simplex method. The rotation angles θx, θy, and θz and the three components (tx, ty, tz) of the translation vector when the evaluation function converges to a minimum value are the optimum rotation angles and translation vectors. By acquiring the coefficients of the camera model at the optimum rotation angles and translation vectors, the camera calibration is completed.

The camera model in which the camera parameters obtained by the camera calibration method according to this embodiment are set can be used, as in the first embodiment, in an image-acquisition device including the camera 2 that is provided with this camera model. In that case, pixel coordinates are obtained by converting the world coordinates into camera coordinates on the basis of Expression 9 and then by substituting the camera coordinates into the camera model in Expression 8.

In this embodiment, the three rotation angles θx, θy, and θz and the three components (tx, ty, tz) of the translation vector are optimized. However, when some of the parameters are known, they may be fixed as known values and excluded from the optimization parameters. In that case, only the remaining one or more unknown rotation angles and components of the translation vector may be optimized. By doing so, the number of optimization parameters is reduced, and thus, the calculation time can be reduced.

Note that the three rotation angles of the three-dimensional coordinates may be arbitrarily defined. In this embodiment, the description has been given by employing the definition that they are the rotation angles about the x-, y-, and z-axes. However, the present invention can of course be applied when other definitions are employed.

In this way, according to the camera calibration method according to this embodiment, a precise camera model can be acquired even when the position and orientation of the camera 2 with respect to the world coordinates are not appropriately aligned. Furthermore, even when a large number of camera parameters, such as distortion, are needed, because the number of parameters for repeated optimization is limited to six or fewer components related to rotation angle and translation, the optimization of the camera model does not fail, and the calculation time can be significantly reduced.

Next, a camera calibration device 32 and a camera calibration method according to a third embodiment of the present invention will be described below with reference to the drawings. The camera calibration device 32 according to this embodiment is used to calibrate multi-viewpoint cameras 33, 34, and 35. Although an example case of calibrating a multi-viewpoint camera including three cameras will be described below, this method can also be applied to the calibration of a multi-viewpoint camera including more or less than three cameras.

Figure 6:
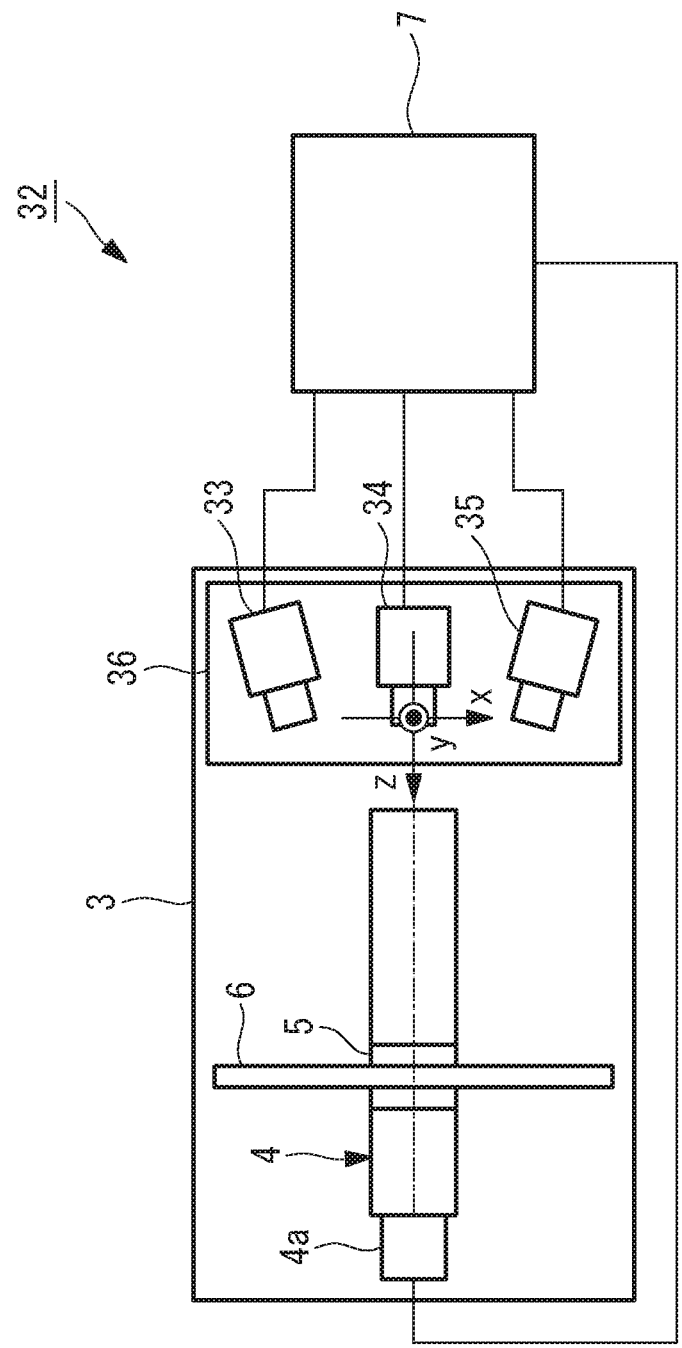
FIG. 6 is a schematic plan view of a calibration device according to a third embodiment of the present invention.

In the camera calibration device 32 according to this embodiment, as shown in FIG. 6, the three cameras 33, 34, and 35 to be calibrated are fixed to a camera fixing base 36 with the same arrangement as in the use condition of the multi-viewpoint cameras. The camera fixing base 36 is attached to the camera calibration device 32 such that each of the cameras 33, 34, and 35 can acquire an image of the calibration chart 6. The configurations of the other components, such as the calibration chart 6, the z-axis moving stage 4, and the computer 7, are the same as those in FIG. 1, and hence, descriptions thereof will be omitted.

The operation of the thus-configured camera calibration device 32 according to this embodiment will be described below. The operation of the camera calibration device 32 according to this embodiment is the same as the camera calibration device 1 according to the first embodiment. First, the measurement program shown in the flowchart in FIG. 3 causes the cameras 33, 34, and 35 to automatically acquire images of the calibration chart 6 at a plurality of object distances, and the pixel coordinates of the grid points 11 on the calibration chart 6 are acquired from these images. Note that steps S2, S4, and S5 in the flowchart in FIG. 3 are performed for each of the three cameras.

Next, camera models of the cameras 33, 34, and 35 are obtained from the above-described measurement data of the cameras 33, 34, and 35. The procedure therefor is the same as that in the first or second embodiment.

The camera models in which the camera parameters obtained with the camera calibration device 32 according to this embodiment are set can be used in an image-acquisition device including the cameras 33, 34, and 35 provided with these camera models, as in the first and second embodiments.

Note that it is not necessary to obtain the measurement data of the multi-viewpoint cameras 33, 34, and 35 at the same time. For example, the measurement program shown in the flowchart in FIG. 3 may be independently and sequentially performed on the cameras. Furthermore, when the measurement data of the cameras 33, 34, and 35 are obtained, the placement position of the z-axis moving stage 4 may be changed on the camera calibration device 32 such that the calibration chart 6 opposes, face-to-face, each of the cameras to be measured.

Note that it is necessary to grasp the amount of change in the placement position and to form measurement data in which the amount of change in the placement position is reflected in the world coordinates of the grid points 11 on the calibration chart 6. This camera calibration method is effective when there is a camera that cannot acquire an image of the calibration chart 6 that is fixed in one direction because the multi-viewpoint cameras 33, 34, and 35 are arranged so as to surround an observation area.

In this way, according to the camera calibration device 32 and the camera calibration method according to this embodiment, the multi-viewpoint cameras 33, 34, and 35 can be calibrated in the same arrangement as in the use condition. Also, it is possible to obtain the pixel coordinates in the cameras 33, 34, and 35 corresponding to one common world coordinate space.

Next, a calibration device according to a fourth embodiment of the present invention will be described below with reference to FIG. 7. A calibration device according to this embodiment is a projector calibration device 37 that includes therein an image forming element (image conversion element: not shown in the figure), such as a liquid-crystal element, and a projection optical system (optical system: not shown in the figure) and that calibrates a projector (projection device) 38 for projecting an image to the outside. In this embodiment, the projector 38 is used as an example optical device.

The projector calibration device 37 includes: a base 39 to which the projector 38 to be calibrated is fixed; the z-axis moving stage 4 provided on the base 39; the calibration chart 6 fixed to the movable part 5 of the z-axis moving stage 4; and the camera 2 that is disposed at a position adjacent to the projector 38 and that acquires an image of the calibration chart 6. The camera 2 and the projector 38 are attached to the projector calibration device 37 such that their optical axes are parallel to the z-axis of the projector calibration device 37 and such that a certain position of the projector 38 matches the coordinate origin.

Note that it is desirable that the image-acquisition area of the camera 2 cover the image projection range of the projector 38. The configurations of the other components, such as the calibration chart 6, the z-axis moving stage 4, and the computer 7, are the same as those in FIG. 1. Note that the calibration chart 6 used in this embodiment may be either the chessboard 10 in FIG. 2 or a plain screen, which are exchangeable. Furthermore, the computer 7 also has a function for controlling the projector 38 to cause the projector 38 to project a predetermined image.

When calibrating the projector 38 by using the thus-configured projector calibration device 37 according to this embodiment, first, the camera 2 is calibrated in a state in which the chessboard 10 in FIG. 2 is disposed as the calibration chart 6. In this case, a backprojection camera model like a conventional model is obtained.

Next, the calibration chart 6 is replaced with the plain screen. Then, the pattern of the chessboard 10 in FIG. 2 is projected on the calibration chart 6 from the projector 38, through the projection optical system. At this time, the pixel coordinates of the grid points 11 and 13 on the chessboard 10 are known for the pixel coordinates defined on the image forming element (not shown in the figure) inside the projector 38.

In this state, as in the first embodiment, by means of the measurement program shown in the flowchart in FIG. 3, images of the calibration chart 6 on which the pattern on the chessboard 10 is projected are automatically captured by the camera 2 at a plurality of object distances, and, from these images, the pixel coordinates of the grid points 11 on the pattern on the chessboard 10 are acquired.

Thereafter, from the acquired pixel coordinates (u, v) and the object distances z of the calibration chart 6, the world coordinates (x, y) of the grid points 11 on the pattern on the chessboard 10 that is projected on the calibration chart 6 are obtained by using the backprojection camera model of the camera 2 calibrated through the above-described procedure. Through the above-described procedure, measurement data representing the correspondence between the pixel coordinates (u, v) and the world coordinates (x, y, z) in the projector 38 can be obtained. The method for obtaining the camera parameters of the projector 38 by fitting the camera model in Expression 8 to this measurement data is the same as that in the first embodiment.

The camera model in which the thus-obtained camera parameters of the projector 38 are set can be used in the projector 38 provided with this camera model, as follows. Firstly, by substituting the world coordinates (x, y) into the camera model in Expression 8, the pixel coordinates (u, v) of the projector 38 corresponding thereto can be obtained.

Figure 5:
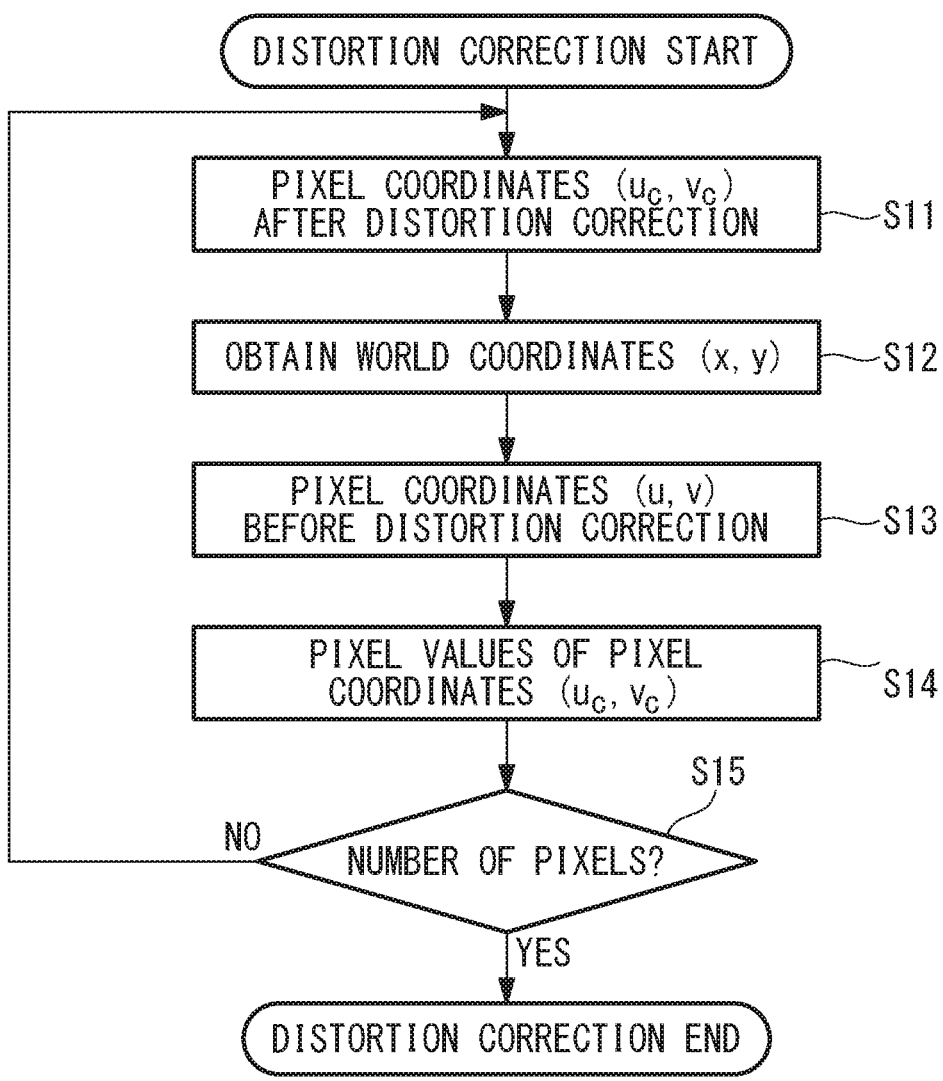
FIG. 5 is a flowchart showing a distortion correcting method.

Secondly, when it is intended to project an image with no distortion, image distortion that cancels out the distortion produced by projection may be preliminarily added to the image formed by the image forming element of the projector 38. The procedure for obtaining the pixel coordinates in the distortion-corrected image is the same as that in the flowchart in the first embodiment, as shown in FIG. 5.

Note that the pattern projected by the projector 38 is not limited to the chessboard 10. A dot mark pattern, which enables the pixel coordinates of the feature points to be calculated from the image captured by the camera 2, may also be used. Alternatively, a method in which discrete pixels in the projector 38 are lit may be employed.

Furthermore, in this embodiment, the world coordinates (x, y) of the feature points projected by the projector 38 are measured with the camera 2, which has been preliminarily calibrated. The measurement thereof may also be performed by a method in which an image-acquisition element is disposed in place of the calibration chart 6 and an image of a projected pattern is directly captured. In addition, provided that the correspondence between the world coordinates and the pixel coordinates can be elucidated, other acquisition methods may also be selected. In this way, the projector calibration device 37 according to this embodiment enables the projector 38 to be calibrated by using a camera model.

Furthermore, in the first to fourth embodiments of the present invention, a plurality of camera calibrations corresponding to changes in settings, such as the focus, zoom, and stop, of the camera 2 or the projector 38 may be performed. Furthermore, a camera model corresponding to an arbitrary setting may be obtained by interpolating these camera models.

In addition, camera calibration may be performed under a plurality of wavelengths of a light source. Furthermore, wavelength-specific camera models may be used in cameras for capturing wavelength-specific images. Furthermore, in the optical devices according to the first to fourth embodiments of the present invention, although the image-acquisition element 18 and the image forming element are used as an example image conversion element, the image conversion element is not limited thereto, and anything that converts between an image and a video signal may be used.

As a result, the above-described embodiments lead to the following aspects.

One aspect of the present invention is a calibration device for an optical device including: a two-dimensional image conversion element having a plurality of pixels; and an optical system for forming an image-formation relationship between the image conversion element and a three-dimensional world coordinate space, the calibration device including: a calibration-data acquisition unit for acquiring calibration data indicating a correspondence between two-dimensional pixel coordinates in the image conversion element and three-dimensional world coordinates in the world coordinate space; and a parameter calculating unit that fits, to the calibration data acquired by the calibration-data acquisition unit, a camera model representing two coordinate values of the two-dimensional pixel coordinates as functions of three coordinate values of the three-dimensional world coordinates, thereby calculating parameters of the camera model.

According to this aspect, the camera model is fitted by the parameter calculating unit to the calibration data that is acquired by the calibration-data acquisition unit and that indicates the correspondence between two-dimensional pixel coordinates in the image conversion element and three-dimensional world coordinates in the world coordinate space, thereby calculating parameters of the camera model. For calculation of the parameters, the camera model, representing two coordinate values of the two-dimensional pixel coordinates as functions of three coordinate values of the three-dimensional world coordinates, is used. As a result, by using a linear model indicating the image-formation relationship between the world coordinates and the pixel coordinates, including distortion, not only can parameters of the camera model be obtained in a short time period with high accuracy but also pixel coordinates corresponding to world coordinates can be obtained in a short time period without performing excessive repeated optimization.

In the above-described aspect, the two coordinate values of the two-dimensional pixel coordinates may be represented by means of a linear sum of a plurality of two-dimensional vector functions having, as elements, the functions of the three coordinate values of the three-dimensional world coordinates.

By doing so, from the three coordinate values of the three-dimensional world coordinates, it is possible to obtain, in a short time period with high accuracy, parameters for easily obtaining the two coordinate values of the two-dimensional pixel coordinates corresponding to each pixel.

In the above-described aspect, the camera model may be represented by a mathematical expression in which each coefficient of a linear image formation model representing the image-formation relationship between two pixel coordinate values of a point on the pixel coordinate plane and two world coordinate values of a point on a plane that is made optically conjugate with the pixel coordinate plane by the optical system is replaced with a power polynomial of the reciprocal of the remaining one world coordinate.

In the above-described aspect, the parameter calculating unit may fit the camera model to the calibration data by a linear least-squares method.

In the above-described aspect, the parameter calculating unit may fit the camera model to, among the calibration data acquired by the calibration-data acquisition unit, the calibration data resulting from converting the three-dimensional world coordinates into world coordinates rotated by at least one rotation angle of three rotation angles representing rotation of the world coordinates, thereby obtaining at least one rotation angle that minimizes the residual error of the camera model.

In the above-described aspect, the parameter calculating unit may fit the camera model to, among the calibration data acquired by the calibration-data acquisition unit, the calibration data resulting from converting the three-dimensional world coordinates into world coordinates translated by at least one component of three translation components representing translation of the world coordinates, thereby obtaining at least one translation component that minimizes the residual error of the camera model.

In the above-described aspect: the optical device may include a plurality of the image conversion elements and an optical system for forming an image-formation relationship between the image conversion elements and the three-dimensional world coordinate space; the calibration-data acquisition unit may acquire calibration data for each of the image conversion elements and the optical system; and the parameter calculating unit may fit, to the calibration data for each of the image conversion elements and the optical system, a camera model represented as a function of the two-dimensional pixel coordinates of each of the image conversion elements.

In the above-described aspect, the optical device may be an image-acquisition device, the image conversion element may be an image-acquisition element, and the optical system may be an image-acquisition optical system.

In addition, in the above-described aspect, the optical device may be a projection device, the image conversion element may be an image forming element, and the optical system may be a projection optical system.

Another aspect of the present invention is a calibration method for an optical device including: a two-dimensional image conversion element having a plurality of pixels; and an optical system for converting an image-formation relationship between the image conversion element and a three-dimensional world coordinate space, the method including: a step of acquiring calibration data indicating the correspondence between two-dimensional pixel coordinates in the image conversion element and three-dimensional world coordinates in the world coordinate space; and a step of fitting, to the acquired calibration data, a camera model representing two coordinate values of the two-dimensional pixel coordinates as functions of three coordinate values of the three-dimensional world coordinates, thereby calculating parameters of the camera model.

In the above-described aspect, the camera model may represent the two coordinate values of the two-dimensional pixel coordinates by means of a linear sum of a plurality of two-dimensional vector functions having, as elements, the functions of the three coordinate values of the three-dimensional world coordinates.

In the above-described aspect, the camera model may be represented by a mathematical expression in which each coefficient of a linear image formation model representing the image-formation relationship between two pixel coordinate values of a point on the pixel coordinate plane and two world coordinate values of a point on a plane that is made optically conjugate with the pixel coordinate plane by the optical system is replaced with a power polynomial of the reciprocal of the remaining one world coordinate.

In the above-described aspect, in the step of calculating the parameters, the camera model may be fitted to the calibration data by a linear least-squares method.

In the above-described aspect, in the step of calculating the parameters, the camera model may be fitted to, among the calibration data acquired in the step of acquiring the calibration-data, the calibration data resulting from converting the three-dimensional world coordinates into world coordinates rotated by at least one rotation angle of three rotation angles representing rotation of the world coordinates, thereby obtaining at least one rotation angle that minimizes the residual error of the camera model.

In the above-described aspect, in the step of calculating the parameters, the camera model may be fitted to, among the calibration data acquired in the step of acquiring the calibration-data, the calibration data resulting from converting the three-dimensional world coordinates into world coordinates translated by at least one component of three translation components representing translation of the world coordinates, thereby obtaining at least one translation component that minimizes the residual error of the camera model.

Another aspect of the present invention is an optical device including a camera model in which parameters calculated by the above-described calibration device are set.

The above-described aspect may include a pixel-coordinate calculation unit for obtaining, by means of the camera model, the two coordinate values of the pixel coordinates from the three coordinate values of the three-dimensional world coordinates.

As a result, by means of the pixel-coordinate calculation unit, it is possible to easily obtain the two coordinate values of the pixel coordinates from the acquired three-dimensional world coordinates.

The above-described aspect may include a distortion-corrected-image generating unit that obtains, by means of the camera model, pixel coordinates, of an image acquired or formed by the image conversion element, corresponding to world coordinates and that generates a distortion-corrected image.

Another aspect of the present invention is an optical device including a camera model in which a rotation angle or a translation component acquired by the above-described calibration device is set as a parameter.

The above-described aspect may include a world coordinate rotation unit or a world coordinate translation unit for converting the world coordinates into world coordinates after having been rotated or translated on the basis of the rotation angle or translation component.

Another aspect of the present invention is an image-acquisition device including the above-described optical device.

Another aspect of the present invention is a projection device including the above-described optical device.

The present invention affords an advantage in that camera parameters can be obtained in a short time period with high accuracy and pixel coordinates corresponding to world coordinates can be obtained in a short time period.

REFERENCE SIGNS LIST 1, 32 Camera calibration device (calibration device)
2 Camera (image-acquisition device, optical device)
7 Computer (parameter calculating unit)
8 Calibration-data acquisition unit
14 Image-acquisition optical system (optical system)
15, 16 Lens (optical system)
18 Image-acquisition element (image conversion element)
37 Projector calibration device (calibration device)
38 Projector (projection device, optical device)

The invention claimed is:

1. A calibration device for an optical device including: at least one two-dimensional image conversion element having a plurality of pixels; and an optical system for forming an image-formation relationship between the at least one two-dimensional image conversion element and a three-dimensional world coordinate space, the calibration device comprising:
    a computer configured to:
        acquire calibration data indicating a correspondence between two-dimensional pixel coordinates in the at least one two-dimensional image conversion element and three-dimensional world coordinates in the world coordinate space; and
        calculate parameters of a camera model by fitting, to the acquired calibration data, the camera model representing two coordinate values of the two-dimensional pixel coordinates as functions of three coordinate values of the three-dimensional world coordinates,
    wherein the camera model represents the two coordinate values of the two-dimensional pixel coordinates by means of a linear sum of a plurality of two-dimensional vector functions having, as elements, the functions of the three coordinate values of the three-dimensional world coordinates, and
    wherein the camera model is represented by a mathematical expression in which each coefficient of a linear image formation model representing the image-formation relationship between two pixel coordinate values of a point on the pixel coordinate plane and two normalized world coordinate values, which are obtained by normalizing, with respect to remaining one world coordinate, two world coordinate values of a point on a plane that is made optically conjugate with the pixel coordinate plane by the optical system, is replaced with a power polynomial having two or more terms of the reciprocal of the remaining one world coordinate.

2. The calibration device according to claim 1, wherein the calculating of the parameters of the camera model fits the camera model to the calibration data by a linear least-squares method.

3. The calibration device according to claim 1,
wherein the calculating of the parameters of the camera model fits the camera model to, among the acquired calibration data, the calibration data resulting from converting the three-dimensional world coordinates into world coordinates rotated by at least one rotation angle of three rotation angles representing rotation of the world coordinates, thereby obtaining at least one rotation angle that minimizes a residual error of the camera model.

4. The calibration device according to claim 1,
wherein the calculating of the parameters of the camera model fits the camera model to, among the acquired calibration data, the calibration data resulting from converting the three-dimensional world coordinates into world coordinates translated by at least one component of three translation components representing translation of the world coordinates, thereby obtaining at least one translation component that minimizes the residual error of the camera model.

5. The calibration device according to claim 1,
wherein the at least one two-dimensional image conversion element comprises a plurality of image conversion elements,
wherein the optical device includes the plurality of image conversion elements and an optical system for forming an image-formation relationship between the plurality of image conversion elements and the three-dimensional world coordinate space,
wherein the acquiring of the calibration-data acquires calibration data for each of the plurality of image conversion elements and the optical system, and
wherein the calculating of the parameter of the camera model fits, to the calibration data for each of the plurality of image conversion elements and the optical system, a camera model represented as a function of the two-dimensional pixel coordinates of each of the plurality of image conversion elements.

6. The calibration device according to claim 1,
wherein the optical device comprises an image-acquisition device,
wherein the at least one two-dimensional image conversion element comprises an image-acquisition element, and
wherein the optical system comprises an image-acquisition optical system.

7. The calibration device according to claim 1,
wherein the optical device comprises a projection device,
wherein the at least one two-dimensional image conversion element comprises an image forming element, and
wherein the optical system comprises a projection optical system.

8. The calibration device according to claim 1,
wherein the each coefficient of the linear image formation model is a distortion coefficient representing distortion.

9. A calibration method for an optical device including: a two-dimensional image conversion element having a plurality of pixels; and an optical system for converting an image-formation relationship between the two-dimensional image conversion element and a three-dimensional world coordinate space, the calibration method comprising:
acquiring calibration data indicating a correspondence between two-dimensional pixel coordinates in the two-dimensional image conversion element and three-dimensional world coordinates in the world coordinate space; and
calculating parameters of a camera model by fitting, to the acquired calibration data, a camera model representing two coordinate values of the two-dimensional pixel coordinates as functions of three coordinate values of the three-dimensional world coordinates,
wherein the camera model represents the two coordinate values of the two-dimensional pixel coordinates by means of a linear sum of a plurality of two-dimensional vector functions having, as elements, the functions of the three coordinate values of the three-dimensional world coordinates, and
wherein the camera model is represented by a mathematical expression in which each coefficient of a linear image formation model representing the image-formation relationship between two pixel coordinate values of a point on the pixel coordinate plane and two normalized world coordinate values, which are obtained by normalizing, with respect to remaining one world coordinate, two world coordinate values of a point on a plane that is made optically conjugate with the pixel coordinate plane by the optical system, is replaced with a power polynomial having two or more terms of the reciprocal of the remaining one world coordinate.

10. The calibration method according to claim 9,
wherein the calculating of the parameters fits the camera model to the calibration data by a linear least-squares method.

11. The calibration method according to claim 9,
wherein the calculating of the parameters of the camera model fits the camera model to, among the acquired calibration data, the calibration data resulting from converting the three-dimensional world coordinates into world coordinates rotated by at least one rotation angle of three rotation angles representing rotation of the world coordinates, thereby obtaining at least one rotation angle that minimizes a residual error of the camera model.

12. The calibration method according to claim 9,
wherein the calculating of the parameters of the camera model fits the camera model to, among the acquired calibration data, the calibration data resulting from converting the three-dimensional world coordinates into world coordinates translated by at least one component of three translation components representing translation of the world coordinates, thereby obtaining at least one translation component that minimizes a residual error of the camera model.

13. An optical device comprising a camera model in which parameters calculated by the calibration device according to claim 1 are set.

14. The optical device according to claim 13,
comprising a pixel-coordinate calculation unit for obtaining, by means of the camera model, the two coordinate values of the pixel coordinates from the three coordinate values of the three-dimensional world coordinates.

15. The optical device according to claim 13, comprising a distortion-corrected-image generating unit that obtains, by means of the camera model, pixel coordinates, of an image acquired or formed by the at least one two-dimensional image conversion element, corresponding to the world coordinates and that generates a distortion-corrected image.

16. An optical device comprising a camera model in which a rotation angle or a translation component acquired by the calibration device according to claim 3 is set as a parameter.

17. The optical device according to claim 16, comprising a world coordinate rotation unit or a world coordinate translation unit for converting the world coordinates into world coordinates after having been rotated or translated on a basis of the rotation angle or translation component.

18. An image-acquisition device comprising the optical device according to claim 16.

19. A projection device comprising the optical device according to claim 16.

* * * * *